United States Patent
Yang et al.

(10) Patent No.: US 8,111,439 B2
(45) Date of Patent: Feb. 7, 2012

(54) OPTICAL SWITCH AND OPTICAL SWITCH DEVICE HAVING THE SAME

(75) Inventors: Yao-Joe Yang, Taipei (TW); Bo-Ting Liao, Taipei (TW); Hsin-Hung Liao, Taipei (TW); Hsin-Hong Shen, Taipei (TW)

(73) Assignee: National Taiwan University, Taipei (TW)

( * ) Notice: Subject to any disclaimer, the term of this patent is extended or adjusted under 35 U.S.C. 154(b) by 218 days.

(21) Appl. No.: 12/649,552

(22) Filed: Dec. 30, 2009

(65) Prior Publication Data

US 2011/0102875 A1   May 5, 2011

(30) Foreign Application Priority Data

Nov. 4, 2009   (TW) .............................. 98137363 A

(51) Int. Cl.
*G02B 26/08*   (2006.01)
(52) U.S. Cl. ...................................... 359/221.1; 385/18
(58) Field of Classification Search ............... 359/221.1, 359/223–226.1; 385/16–24, 140
See application file for complete search history.

(56) References Cited

U.S. PATENT DOCUMENTS

| | | | | |
|---|---|---|---|---|
| 6,229,640 B1 * | 5/2001 | Zhang | ......................... | 359/223.1 |
| 6,901,204 B2 * | 5/2005 | Hong et al. | .................... | 385/140 |
| 7,039,268 B2 * | 5/2006 | Yoshida et al. | .................. | 385/18 |

OTHER PUBLICATIONS

Liao et al., "A bi-stable 2×2 optical switch monolithically integrated with variable optical attenuators," Optics Express, vol. 17, No. 22 (2009).
Kwon et al., "Attenuation-controllable micromachined 2×2 optical switches using 45-deg micromirrors," Optical Engineering, vol. 45, No. 6 (2006).
Chen et al., "Novel Multifunctional Device for Optical Power Splitting, Switching, and Attenuating," IEEE Photonics Technology Letters, vol. 20, No. 8 (2008).

* cited by examiner

*Primary Examiner* — Euncha Cherry
(74) *Attorney, Agent, or Firm* — Peter F. Corless; Steven M. Jensen; Edwards Wildman Palmer LLP

(57) ABSTRACT

Provided is an optical switch member including a bi-stable mechanism, and first and second electro-thermal actuators. The bi-stable mechanism includes a curved-beam disposed on a bending portion of a first cantilever, one end of the first cantilever having a driven portion disposed thereon. The first electro-thermal actuator includes a first beam of a first driven arm disposed on the bending portion. The second electro-thermal actuator includes a second beam of a second driven arm disposed on the bending portion. The ends of the first and second driven arms are adjacent to first and second sides of the driven arm, respectively. Also proposed is an optical switch device including a substrate, a third thermal actuator, and the optical switch member disposed on the substrate to form an optical switch device to thereby integrate the optical switch with variable optical attenuators on the substrate.

21 Claims, 10 Drawing Sheets

OPTICAL SWITCH AND OPTICAL SWITCH DEVICE HAVING THE SAME

CROSS-REFERENCES TO RELATED APPLICATIONS

This application claims under 35 U.S.C. §119(a) the benefit of Taiwanese Application No. 98137363 filed Nov. 4, 2009 the entire contents of which is incorporated herein by reference.

BACKGROUND OF THE INVENTION

1. Field of the Invention

The present invention relates to optical switches and optical switch devices having the same, and more particularly, to an optical switch for use with bi-stable mechanisms in conjunction with electro-thermal actuators, and an optical switch device equipped with the optical switch and configured to integrate the optical switch with variable optical attenuators.

2. Description of Related Art

Optical communication products have become mainstream due to the ever-growing demand for faster data transmission capability. Various optical communication components, such as optical fibers, optical waveguides, optical switches (OS), and variable optical attenuators (VOA), are widely used.

Optical fiber has the advantages of high transmission speed, low noise, light weightness and secure privacy and thus has become an indispensable transmission medium for modern communication networks. Optical switches play a key role in the optical switching of light signals in optical communication networks because they can selectively switch signals from an input end to a specific output end of an optical fiber network. Optical attenuators adjust the intensity of optical signals and are effective in measuring indices of optical fiber systems, attenuating signals in short distance communications systems, and testing systems. Currently there are many different techniques available for optical fibers, optical switches and optical attenuators, such as, the thermo-optics techniques, the liquid-crystal technique and Micro-Electro-Mechanical Systems (MEMS).

Referring to FIG. 1A through FIG. 1B, the prior art discloses a MEMS-based cross-bar-type optical switch comprising four optical pathways arranged cruciformly. As shown in FIG. 1A, with a mirror 10 being at a first position 15 (out of the way of the paths of the optical signals), an optical signal input by a first optical input pathway 11 enters a first optical output pathway 13, and an optical signal input by a second optical input pathway 14 enters a second optical output pathway 12. As shown in FIG. 1B, the mirror 10 moves from the first position 15 to a second position (in the way of the paths of the optical signals) to thereby divert the optical signal input by the first optical input pathway 11 to the second optical output pathway 12 and divert the optical signal input by the second optical input pathway 14 to the first optical output pathway 13. However, to prevent optical signals from deviating from the optical pathways, the mirror 10 needs to be double-sided and of a limited thickness. Moreover, extra energy, such as electrostatic energy, is required for keeping the mirror 10 at the first position 15 or the second position.

Regarding optical communication devices, "attenuation-controllable micromachined 2×2 optical switches using 45-deg micromirrors" was proposed by Kwon et al. in 2006; however, the technique is known to cause relatively great optical energy loss since it requires two sets of mirrors in order to reflect input optical signals to an output end. Subsequently in 2008, Chen et al. disclosed a "novel multifunctional device for optical power splitting, switching, and attenuating," comprising a movable cantilever and a triangular reflective mirror configured to function as an optical splitter and perform optical path switching and optical attenuation by moving or twisting the cantilever. However, with the main application limited to optical switching and adjustment of 1×2 optical pathways and with a difficult fabrication process, the device is less than optimal.

The application of optical fiber technologies is indispensable to optical fiber communication networks, data transmission and cable TV transmission. Consequently, miniaturization, enhancement of optical signal switching speed, and reduction of loss of optical signal energy are the main areas of challenge and the requirements to be met and improved.

SUMMARY OF THE INVENTION

In view of the foregoing drawbacks of the prior art, a primary objective of the present invention is to provide an optical switch comprised of a bi-stable mechanism having two anchors and a curved-beam disposed between the two anchors, wherein a first cantilever is formed on a bending portion of the curved-beam by extending from both ends of the curved-beam, and wherein one end of the curved-beam has a driven portion disposed thereon, the driven portion having a first side extending in a direction away from the curved-beam and a corresponding second side, and the bi-stable mechanism has a first stable mode and a second stable mode; a first electro-thermal actuator disposed at a position adjacent to the driven portion of the bi-stable mechanism and comprised of two anchors and a first beam disposed between the anchors, wherein the first beam has a bending portion bending towards the direction of the bi-stable mechanism and a first driving arm extending from the first beam, the end of the first driving arm being adjacent to the driven portion of the bi-stable mechanism; a second electro-thermal actuator disposed at a position adjacent to the driven portion of the bi-stable mechanism and comprised of two anchors and a second beam that is disposed between the anchors, the second electro-thermal actuator being coupled to the first electro-thermal actuator by connecting one of their anchors with each other, wherein the second beam has a bending portion bending away from the direction of the bi-stable mechanism and a second driving arm extending from the second beam, the end of the second driving arm being adjacent to the second side of the driven portion.

In the foregoing switch of the present invention, when the bi-stable mechanism is in the first stable mode, the curved-beam bends away from the driven portion, whereas when the bi-stable mechanism is in the second stable mode, the curved-beam bends towards the driven portion.

In one preferred embodiment, the curved-beam is a bi-conductor structure with a difference in thermal expansion coefficient in the two constituent conductors of the bi-conductor structure. The bending portions of first and second beams bend in opposite directions.

The present invention further proposes an optical switch device, comprising: a substrate having at least an optical input pathway and an optical output pathway; at least an optical switch as described above formed on the substrate and having a first reflective unit that is disposed at an end of the first cantilever with respect to the driven portion; and at least a third thermal actuator disposed in close proximity to the first cantilever of the bi-stable mechanism and comprised of a third beam and an anchor disposed on both ends of the third beam and fixed in position to the substrate, wherein the third beam comprises a bending portion and a second cantilever formed on the bending portion by extending from the third beam, and wherein the end of the second cantilever has a second reflective unit.

Compared to the prior art, the switch proposed by the present invention is characterized by integrating a bi-stable mechanism with electro-thermal actuators that actuate driving arms to drive the bi-stable mechanism to thereby enable selective switching between first and second stable modes. Further, the optical switch device of the present invention is characterized by using one or more switches and third electro-thermal actuators operating on the substrate, thereby integrating the functions of an optical switch and a variable optical attenuator on the same substrate and also fastening the reflective unit in the two stable modes by operating the electro-thermal actuators and the bi-stable mechanism to selectively switch optical signals from one end to another as desired. Accordingly, the position of the reflective unit is varied by applying voltages of varying intensities on the electro-thermal actuators and the bi-stable mechanism, thereby adjusting the amount of output energy of optical signals to achieve variable optical attenuation.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The following illustrative embodiments are provided to illustrate the disclosure of the present invention, these and other advantages and effects being understandable by persons skilled in the art after reading the disclosure of this specification.

First Preferred Embodiment

Figure 1A:
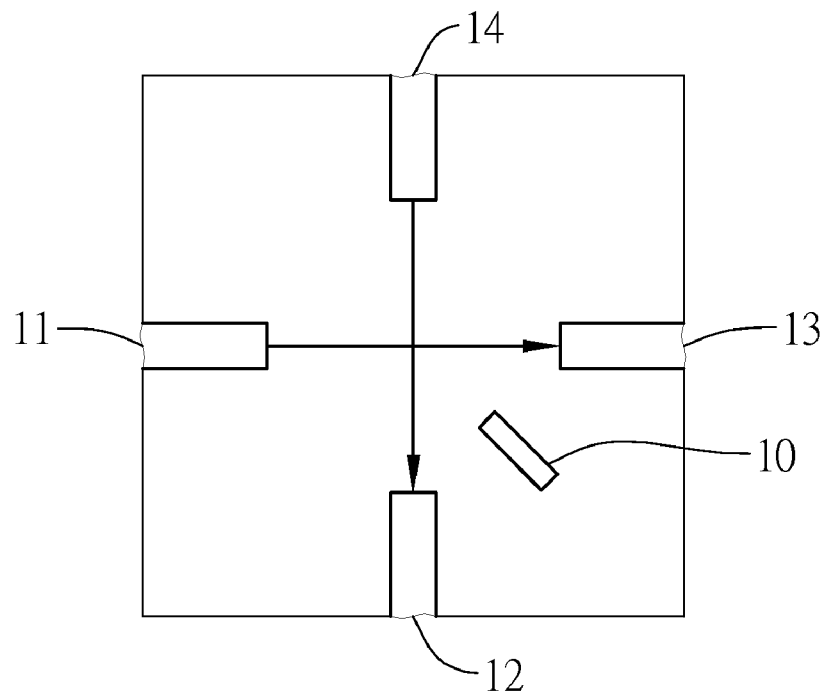
FIG. 1A is a diagrammatic illustration of a conventional cross-bar-type optical switch and optical signals passing therethrough.
Figure 1B:
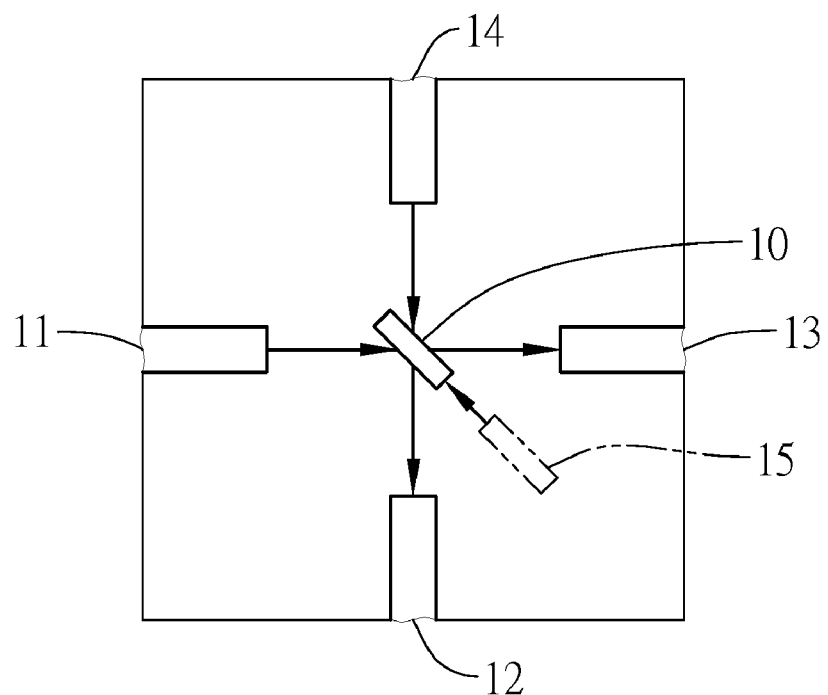
FIG. 1B is a diagrammatic illustration showing mirror-reflected optical signals of the conventional cross-bar-type optical switch.
Figure 2:
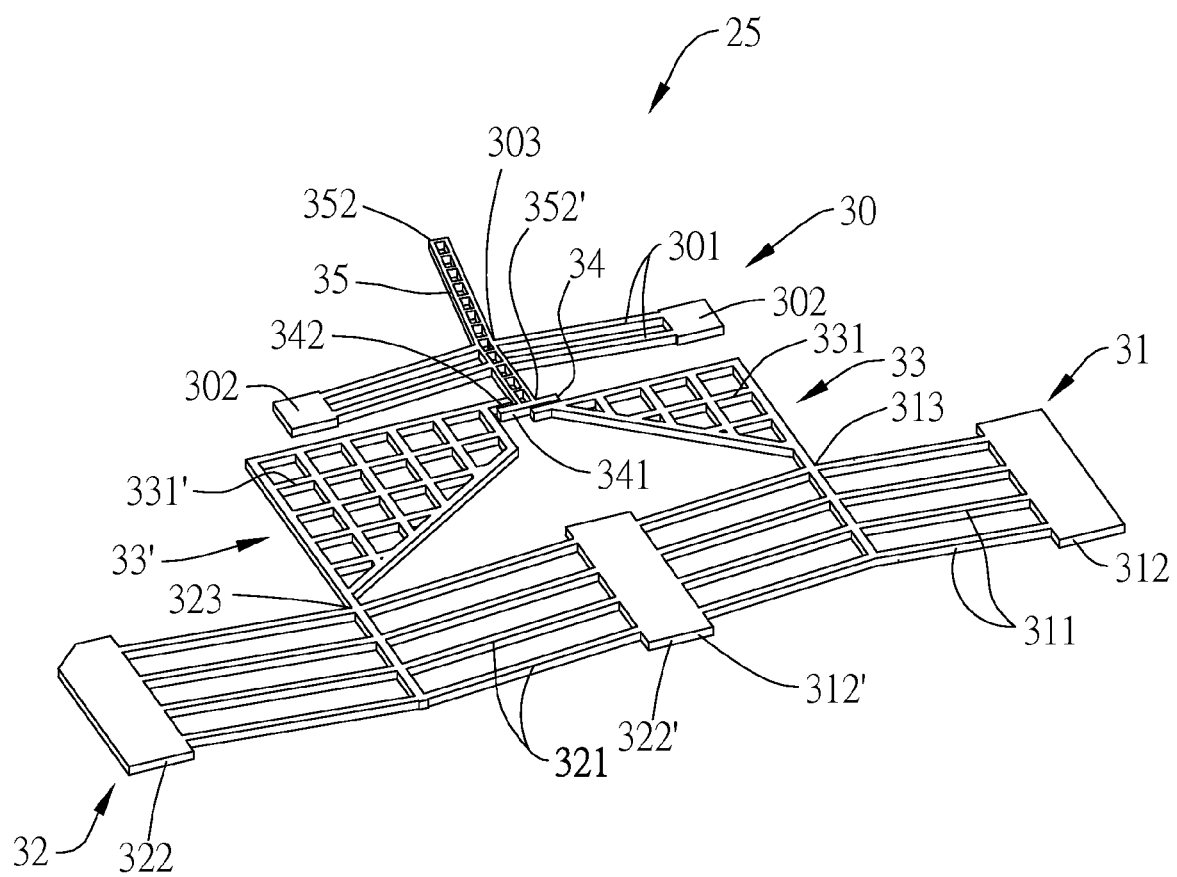
FIG. 2 is a perspective view of the basic construction of an optical switch in accordance with the first preferred embodiment of the present invention.

Referring to FIG. 2, there is shown a perspective view of the basic construction of an optical switch according to the first preferred embodiment of the present invention. As shown in the drawing, an optical switch 25 comprises a bi-stable mechanism 30, a first electro-thermal actuator 31, and a second electro-thermal actuator 32.

The bi-stable mechanism 30 has two anchors 302 and a curved-beam 301 connected between the anchors 302. A first cantilever 35 extends, in two opposite directions, from a bending portion 303 of the curved-beam 301 such that the first cantilever 35 has a first end 352 and a second end 352'. The second end 352' has a driven portion 34 disposed thereon. The driven portion 34 has a first side 341 facing away from the curved-beam 301 and a second side 342 opposite to the first side 341. The bi-stable mechanism 30 has a first stable mode and a second stable mode and switches between the first stable mode and the second stable mode under an external force.

In practice, the curved-beam 301 of the bi-stable mechanism 30 bends away from the driven portion 34 in the first stable mode and bends towards the driven portion 34 in the second stable mode. The curved-beam 301 of the bi-stable mechanism 30 is a bi-conductor structure with a difference in thermal expansion coefficient in the two constituent conductors of the bi-conductor structure. In practice, when the bi-stable mechanism 30 is in the first stable mode, a voltage is applied across the two anchors 302 thereof such that the curved-beam 301 bends away from the driven portion 34. Conversely, when the bi-stable mechanism 30 is in the second stable mode, a voltage is applied across the anchors 302 such that the curved-beam 301 bends towards the driven portion 34.

Figure 3A:
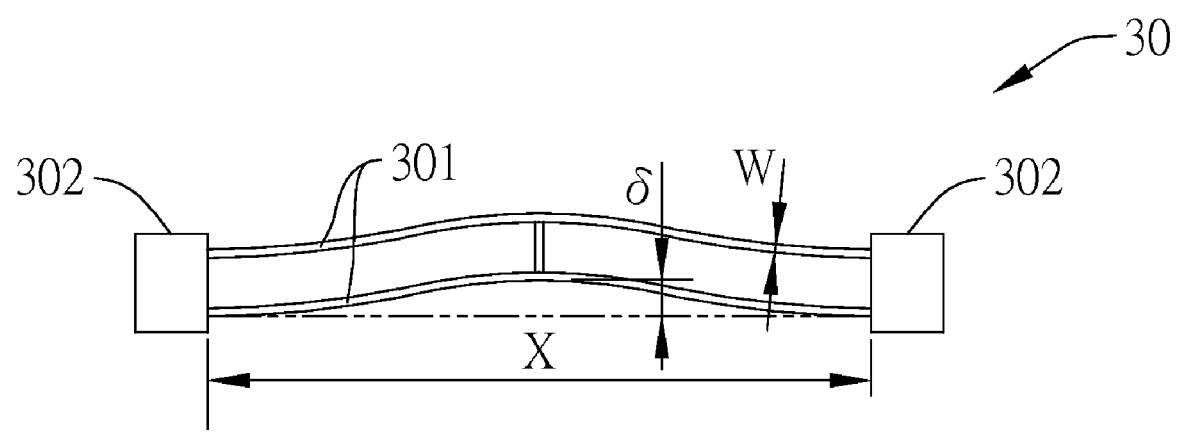
FIG. 3A is a diagrammatic illustration showing the first stable mode of the bi-stable mechanism of the optical switch in accordance with the present invention.
Figure 3B:
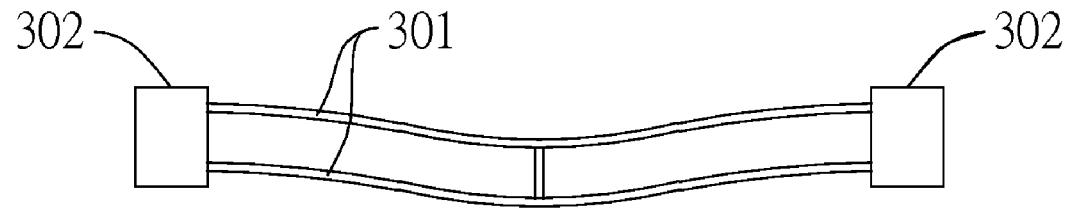
FIG. 3B is a diagrammatic illustration showing the second stable mode of the bi-stable mechanism of the optical switch in accordance with the present invention.

Specifically, the bi-stable mechanism 30 comprises two parallel curved-beams 301, as illustrated in FIGS. 3A and 3B, in which the two curved-beams 301 are clamped at the middle thereof so as to keep them from turning or moving pliably. The shape of the curved-beams 301 causes them to be in a buckling mode due to axial loading. The distance X between the two anchors 302 is 3000 μm. The width W of the curved-beams 301 is 8 μm. The central offset δ of the curved-beams 301 is 40 μm but is not limited thereto. In general, the above-mentioned dimensions may vary, depending on the application of the optical switch and the performance and efficacy of the formed device. Also note that the bi-stable mechanism 30 is not limited to being formed by two said curved-beams 301; the bi-stable mechanism 30 can also be formed by either a single curved-beam or multiple curved-beams.

In addition, the bi-stable mechanism 30 provides two stable modes and thus is capable of latching, as shown in FIGS. 3A and 3B. FIG. 3A and FIG. 3B depict first and second stable modes of the bi-stable mechanism 30 in accordance with the present invention, respectively. By exerting an increasing external force on the central tip of the bi-stable mechanism 30 until a threshold value is passed, the first stable mode of the bi-stable mechanism 30 is switched to the second stable mode. Conversely, by exerting an external force to the center tip on the other side of the bi-stable mechanism 30 until a threshold value is passed, the second stable mode of the bi-stable mechanism 30 is switched back to the first stable mode. In a preferred embodiment, the bi-stable mechanism 30 is capable of switching between the two stable modes in a snapping manner.

Referring again to FIG. 2, the first cantilever 35 may be a truss structure to enhance the stiffness thereof in one preferred embodiment. Further, the bi-stable mechanism 30 may optionally have reflective units or other elements disposed at the first end thereof to implement the function of driving objects as required.

The first electro-thermal actuator 31 is disposed in close proximity to the driven portion 34 of the bi-stable mechanism 30, and includes anchors 312, 312' and a first beam 311 disposed between anchors 312, 312'. The first beam 311 comprises a bending portion 313 bending towards the bi-stable mechanism 30, wherein a first driving arm 33 extending from the first beam 311 is disposed on the bending portion 313, and the end of the first driving arm 33 is adjacent to the first side 341 of the driven portion 34.

The second electro-thermal actuator 32 is disposed in close proximity to the driven portion 34 of the bi-stable mechanism 30, and includes anchors 322, 322' and a second beam 321 that is disposed between anchors 322, 322', wherein the second electro-thermal actuator 32 is coupled to the first electro-thermal actuator 31 by connecting either one of the anchors 322' and 312' thereof with each other. The second beam 321 comprises a bending portion 323 bending away from the bi-stable mechanism 30, wherein a second driving arm 33' extending from the second beam 321 is disposed on the bending portion 323, and the end of the first driving arm 33' is adjacent to the second side 342 of the driven portion 34.

Typically, the first and second beams 311, 321 are formed by connecting two conductors of different thermal expansion coefficients, such that, when a voltage is applied across the two anchors of the first and second beams 311, 321, the beams 311, 321 bend toward the side of the conductor that has the higher thermal expansion coefficient. In one application, when a voltage is applied across anchors 312, 312' of the first electro-thermal actuator 31, the first beam 311 bends towards the bi-stable mechanism 30 which causes the first driving arm 33 to move along with the first beam 311 towards the bi-stable mechanism 30, such that the end of the first driving arm 33 abuts against the first side 341 of the driven portion 34 and drives the driven portion 34, thereby pushing the bi-stable mechanism 30 to switch from the second stable mode to the first stable mode. In other words, the curved-beam 301 of the bi-stable mechanism bends towards the driven portion 34 to switch from the second stable mode to the first stable mode, wherein it is bent away from the driven portion 34.

Similarly, when voltage is applied across the two anchors 322, 322' of the second electro-thermal actuator 32, the second beam 321 bends away from the bi-stable mechanism 30 to cause the second driving arm 33' to move along with the first beam 311 towards the bi-stable mechanism 30, such that the end of the second driving arm 33' abuts against the second side 342 of the driven portion 34 and drives the driven portion 34, thereby causing the bi-stable mechanism 30 to switch from the first stable mode to the second stable mode, that is, the curved-beam 301 of the bi-stable mechanism 30 bends away from the driven portion 34 to switch from the first stable mode to the second stable mode, wherein it is bent towards the driven portion 34. Note that the means of driving the first and second electro-thermal actuators is not limited to pushing or pulling as described above.

In the preferred embodiment of FIG. 2, the first and second beams 311, 321 may be formed by a plurality of parallel V-beams and have a thickness of 10 μm. The bending portions 313, 323 of the first and second beams 311, 321 are configured to bend in opposite directions from one another. In one embodiment, the first and second driving arms 33, 33' are line-bending structures and are provided with reinforced ribs 331, 331' at their respective bending angles. Note that in differing embodiments the thickness of the first and second beams 311, 321, the bending directions of bending portions 313, 323 and the structures of the first and second driving arms 33, 33' may be flexibly adjusted as needed. Also, the first driving arm 33 and/or the second driving arm 33' may or may not be provided with the reinforced ribs 331 and/or the reinforced ribs 331'.

Second Preferred Embodiment

Figure 5:
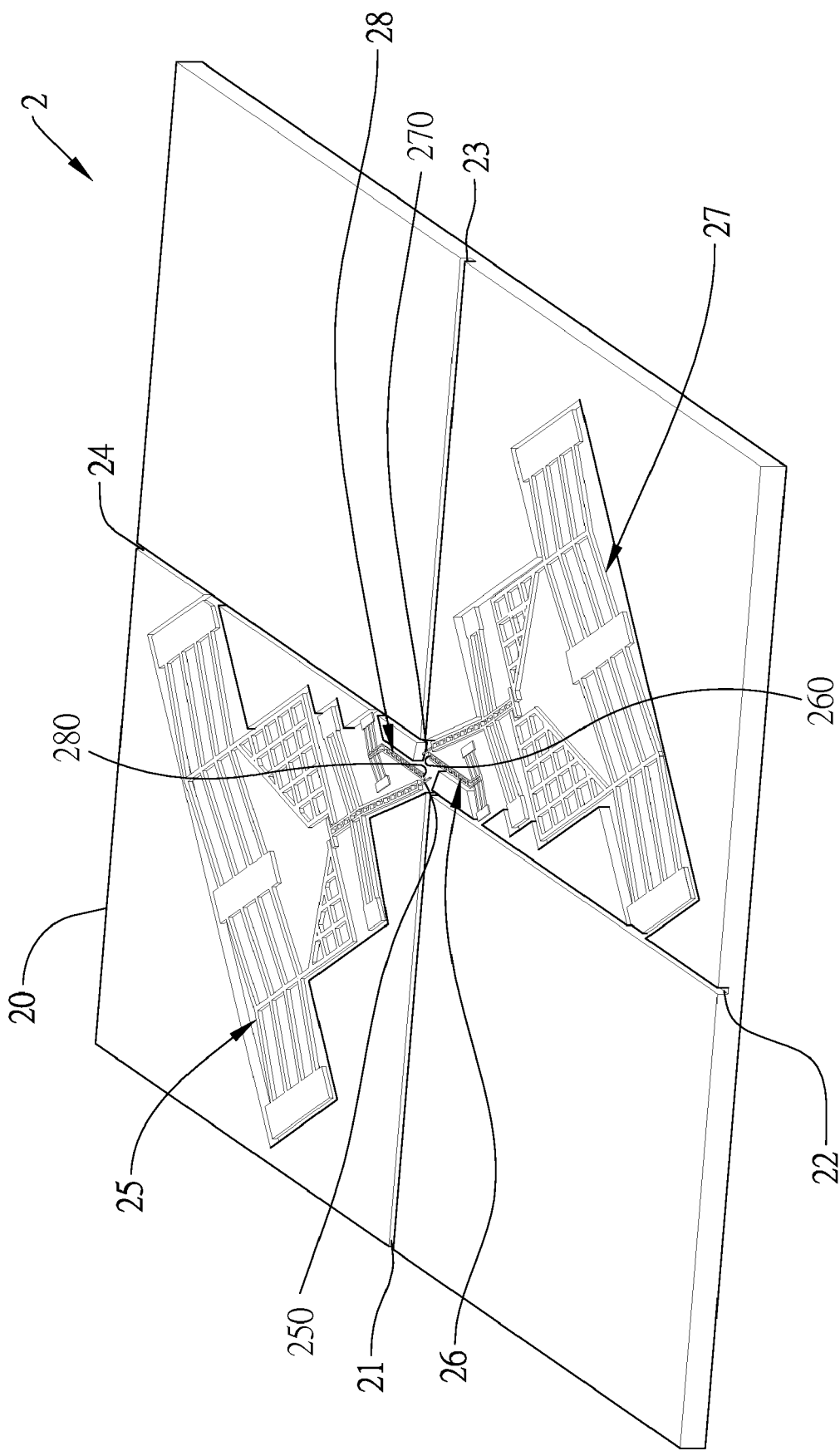
FIG. 5 is a perspective view of the basic construction of an optical switch device in accordance with the present invention.

FIG. 5 illustrates a second preferred embodiment of the invention. In this embodiment, an optical switch device integrating the optical switch 25 is provided, comprising a substrate 20, at least a said optical switch 25 (as shown in FIG. 2) and one or more third electro-thermal actuators 26.

The substrate 20 comprises at least an optical input pathway and an optical output pathway, wherein at least a said optical switch 25 (as shown in FIG. 2) is formed on the substrate 20. The bi-stable mechanism 30 of the optical switch 25 and the first and second electro-thermal actuators 31, 32 are fixed in position to the substrate 20 by means of the anchors, respectively.

Figure 4:
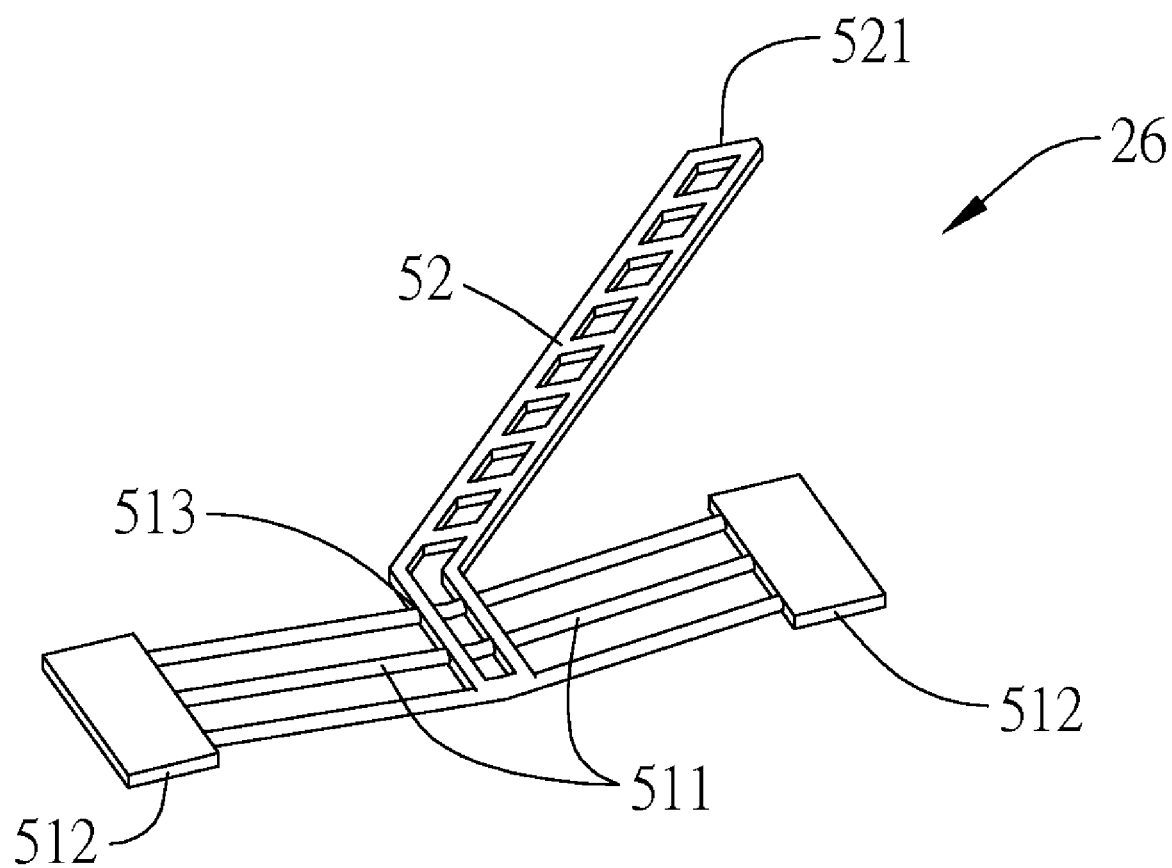
FIG. 4 is a perspective view of the basic construction of the optical switch in accordance with a second preferred embodiment of the present invention.

Referring to FIG. 2 together with FIG. 4, the basic construction of the switch in the first and second preferred embodiments according to the present invention is illustrated respectively in the drawings. The third electro-thermal actuator 26 is disposed in close proximity to the first cantilever 35 of the bi-stable mechanism 30, and has a third beam 511 and two anchors 512 each disposed on one of the two ends of the third beam 511 to be fixed in position to the substrate 20. The third beam has a bending portion 513 whereon a second cantilever 52 is formed by extending from the third beam 511. Typically, the third beam is formed by two adjacent connected conductors of varying thermal expansion coefficients. It is to be noted that in different embodiments of the present invention, the third electro-thermal actuator 26 may optionally include reflective units or other elements that enable the third electro-thermal actuator 26 to drive objects as required.

Specifically in this embodiment, when applying a voltage across the two anchors 512 of the third electro-thermal actuator 26, the third beam 511 bends away from the end 521 of the second cantilever 52, causing the second cantilever 52 to follow the bending of the third beam 511 and move away from the end 521 of the second cantilever 52. In another embodiment, the third beam 511 bends towards the end 521 of the second cantilever 52, causing the second cantilever 52 to follow the bending of the third beam 511 and move towards the end 521 of the second cantilever 52.

In this embodiment, the third beam 511 is composed of a plurality of parallel V-beams. In another embodiment, the first cantilever 52 may be a truss structure.

FIG. 5 is a perspective view of the basic construction of the optical switch device in accordance with the present invention. In application, the optical switch device is specifically applied to microelectromechanical systems (MEMS). Note that the illustration of FIG. 5 represents only one of the exemplary embodiments and should not be construed as restrictive of the applications and variations of the optical switch device. As depicted, the optical switch device 2 comprises a substrate 20, a first optical input pathway 21, a first optical output pathway 22, a second optical input pathway 23, a second optical output pathway 24, two optical switches 25, 27 and two third electro-thermal actuators 26, 28. Note that in this embodiment, the optical switches 25, 27 are of different structures, whereas the third electro-thermal actuators 26, 28 are of the same structures.

The first optical input pathway 21, the first optical output pathway 22, the second optical input pathway 23, the second optical output pathway 24 are all formed on the substrate 20 by a groove adapted to store optical fibers therein, wherein the first optical input pathway 21 is perpendicular to the first optical output pathway 22, and the second optical input pathway 23 is perpendicular to the second optical output pathway 24, and wherein the first optical input pathway 21 is parallel to the second optical input pathway 23 such that optical signals are alternately input in the corresponding directions, and the first optical output pathway 22 is parallel to the second optical output pathway 24 such that optical signals are alternately input in opposite directions. More specifically, the four optical pathways are configured to form a split cross-bar, SCB configuration. It is to be noted that in other embodiments, the number of the optical pathways on the substrate 20 and the optical pathways used for optical input or output are all adjustable according to the actual requirements.

In particular, the third electro-thermal actuator 26 and the optical switch 27 are disposed at a region formed between the first optical output pathway 22 and the second optical input pathway 23, and the third electro-thermal actuator 28 and the optical switch 25 are disposed at a region formed between the first optical input pathway 21 and the second optical output pathway 24.

The end of the first cantilever 35 of the optical switch 25, the end of the second cantilever of the third electro-thermal actuator 26, the end of the first cantilever of the optical switch 27, and the end of the second cantilever of the third electro-thermal actuator 28 comprise first, second, third and fourth reflective units 250, 260, 270 and 280, respectively, and the third electro-thermal actuator 26, the optical switch 27 and the third electro-thermal actuator 28 drive their respective reflective units via the optical switch 25, thereby switching optical signals input by first and second optical input pathways 21, 23 in between the first and second optical output pathways 22, 24, and also adjust the intensity of optical signals entering the first and second optical output pathways 22, 24.

In compliance with the design of the split cross-bar (the SCB optical pathway), the first cantilever of the optical switches 25, 27 may be designed to have folding lines having a curving angle of 0.6 degree instead of a straight arm, as shown in FIG. 5, and note that the curving angle may be at different degrees in other embodiments. Similarly, the second cantilever of the third electro-thermal actuators 26, 28 may also be of a structure with folding lines to comply with the split cross-bar (SCB optical pathway), and the curving angle may vary depending on the structure of the optical switch device.

In the embodiment of FIG. 5, the distance between the anchors of the second electro-thermal actuators of the optical switches 25, 27, the first electro-thermal actuators of the optical switches 25, 27, and the third electro-thermal actuators 26, 28, equals the lengths of the second beam of the second electro-thermal actuators of the optical switches 25, 27, the first beam of the first electro-thermal actuators of the optical switches 25, 27, and the third beam of the third electro-thermal actuators 26, 28, at 4000 µm, 3000 µm, and 1000 µm respectively.

FIGS. 6A through 6D are top views showing the optical switching of optical signal pathways in the optical switch device, and respectively illustrate the operation of the optical switches described in FIG. 2 and the third electro-thermal actuators 26, 28 depicted in FIG. 4 on the substrate shown in FIG. 5. The substrate 20 of the optical switch device 2 has four optical pathways including the first optical input pathway 21, the first optical output pathway 22, the second optical input pathway 23, and the second optical output pathway 24, and also four reflective units including first, second, third, and fourth reflective units 250, 260, 270, 280. Note that the four reflective units, namely the first, second, third and fourth reflective units 250, 260, 270, 280, are respectively controlled by the optical switch 25, the third electro-thermal actuator 26, the optical switch 27 and the third electro-thermal actuator 28.

Figure 6A:
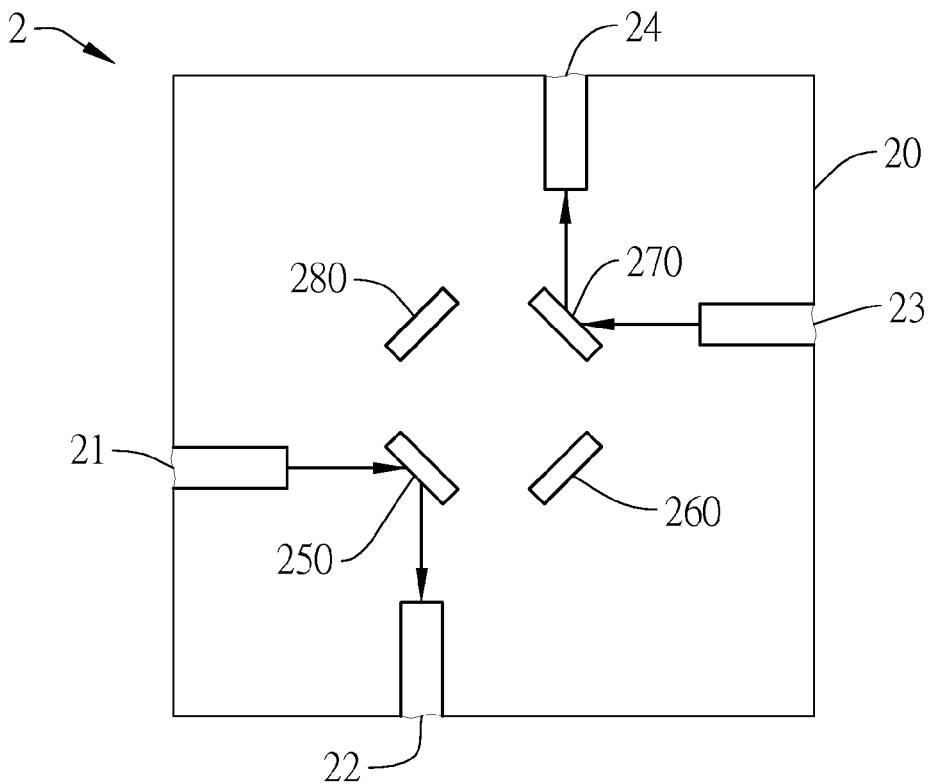
FIG. 6A and FIG. 6B are diagrammatic illustrations showing the operation of the optical switch device in accordance with the present invention.

As shown in FIG. 6A, the first, second, third and the fourth reflective units 250, 260, 270, 280 are all located at their original positions. The optical signal input by the first optical input pathway 21 enters the first optical output pathway 22 via the first reflective unit 250, and the optical signal input by the second optical input pathway 23 enters the second optical output pathway 24 via the third reflective unit 270.

Figure 6B:
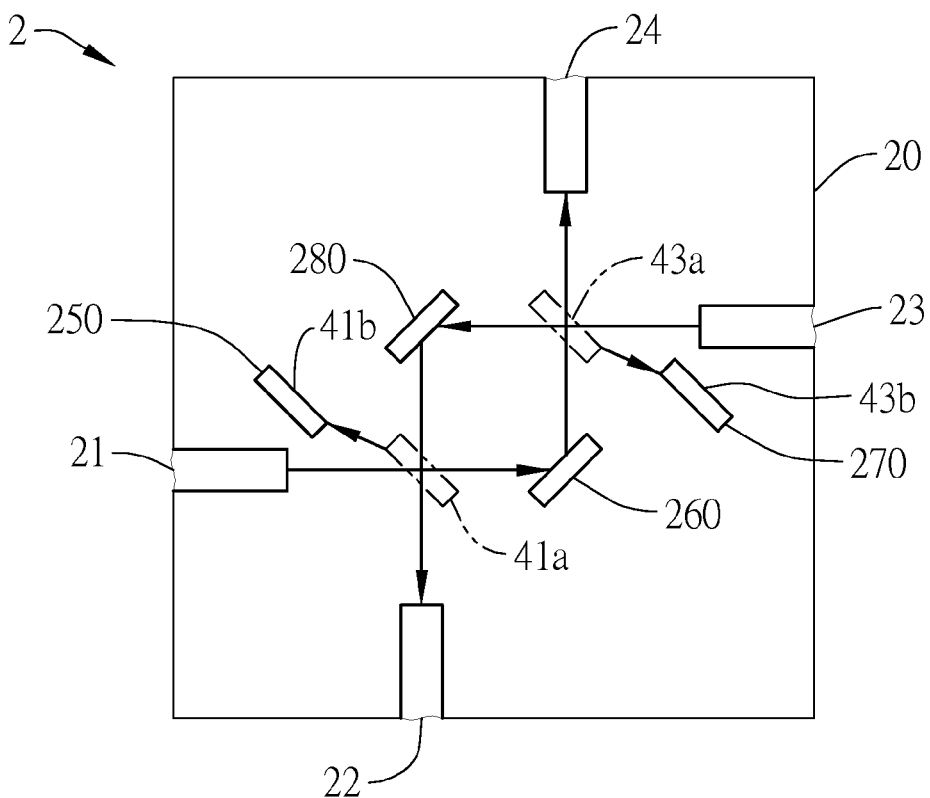

As shown in FIG. 6B, when the first and third reflective units 250, 270 are at their respective original positions 41a, 43a, a voltage may be applied to the second electro-thermal actuator of the optical switches 25, 27, resulting in the second driving arm of the second electro-thermal actuator exerting a force to the driven portion of the first cantilever of the bending portion of the bi-stable mechanism such that the bi-stable mechanism is switched to the second stable mode, causing the first and third reflective units 250, 270 disposed at the end of the first cantilever of the optical switches 25, 27 to move along to the second positions 41b, 43b. In other words, the first and third reflective units 250, 270 depart from the optical pathways by which the first and second optical input pathways 21, 23 input optical signals, and, consequently, the optical signal input by the first optical input pathway 21 enters the second optical output pathway 24 via the second reflective unit 260, and the optical signal input by the second optical input pathway 23 enters the first optical output pathway 22 via the fourth reflective unit 280.

As can be understood from the embodiments depicted in FIGS. 6A and 6B, the bi-stable mechanism of the optical switches 25, 27 is switched from the first stable mode to the second stable mode by applying a voltage to the second electro-thermal actuator of the optical switches 25, 27, such that the first and third reflective units 250, 270 move from their original positions 41a and 43a to second positions 41b and 43b, as shown in FIG. 6B. Conversely, the bi-stable mechanism of the optical switches 25, 27 can be switched from the second stable mode to the first stable mode by applying a voltage to the first electro-thermal actuator of the optical switches 25, 27, causing the first and third reflective units 250, 270 to move from the second positions 41b and 43b to their original positions 41a and 43a shown in FIG. 6A. In this embodiment, the distance between the original positions 41a, 43a and the second positions 41b, 43b is approximately 100 µm for both, but the original and second positions may be adjusted as needed.

Accordingly, optical signals input by the first optical input pathway 21 can be switched between the first optical output pathway 22 and the second optical output pathway 24 before being output, and optical signals input by the second optical input pathways 23 can be switched between the first optical output pathway 24 and the second optical output pathway 22 before being output, thereby achieving one of the objectives of the present invention, that is, switching optical signals.

Figure 6C:
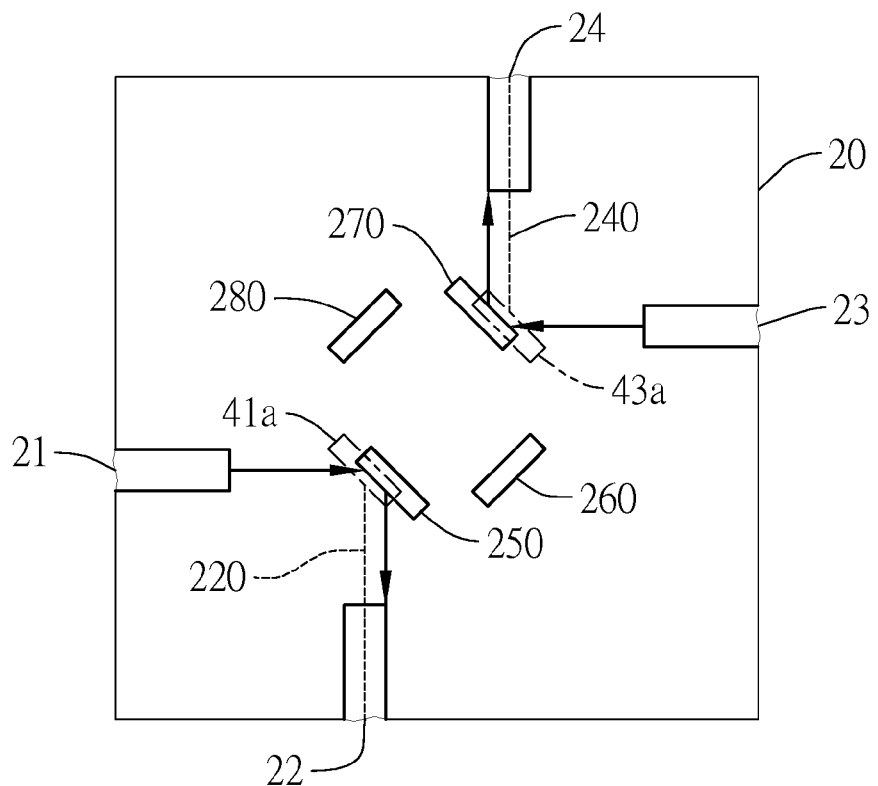
FIG. 6C and FIG. 6D are diagrammatic illustrations showing the operation of the optical switch device in accordance with the present invention.

Referring to FIG. 6C, the optical input signals may be attenuated rather than switched. When the first and third reflective units 250, 270 are at the original positions 41a and 43a, a voltage may be applied to the bi-stable mechanism of the optical switches 25, 27, and thus the first cantilever having a reflective unit moves towards the reflective unit. Consequently, the first and third reflective units 250, 270 disposed at the end of the first cantilever of the optical switches 25, 27 move away from the original positions 41a, 43a. The first reflective unit 250 moves away from the original position 41a, such that the optical signal input by the first optical input pathway 21 moves away the axis 220 of the first optical output pathway 22 but still enters the first optical output pathway 22, leading to attenuation of the optical signal in the first optical output pathway 22. Similarly, the optical signals input by the second optical input pathway 23 moves away from the axis 240 of the second optical output pathway 24 by the third reflective unit 270 moving away from its original position 43a, but still enters the second optical output pathway 24 and thus attenuate the optical signals entering the second optical output pathway 24. Note that the first and third reflective units 250, 270 are not limited to move away from their respective original positions 41a, 43a concurrently in this embodiment.

Figure 6D:
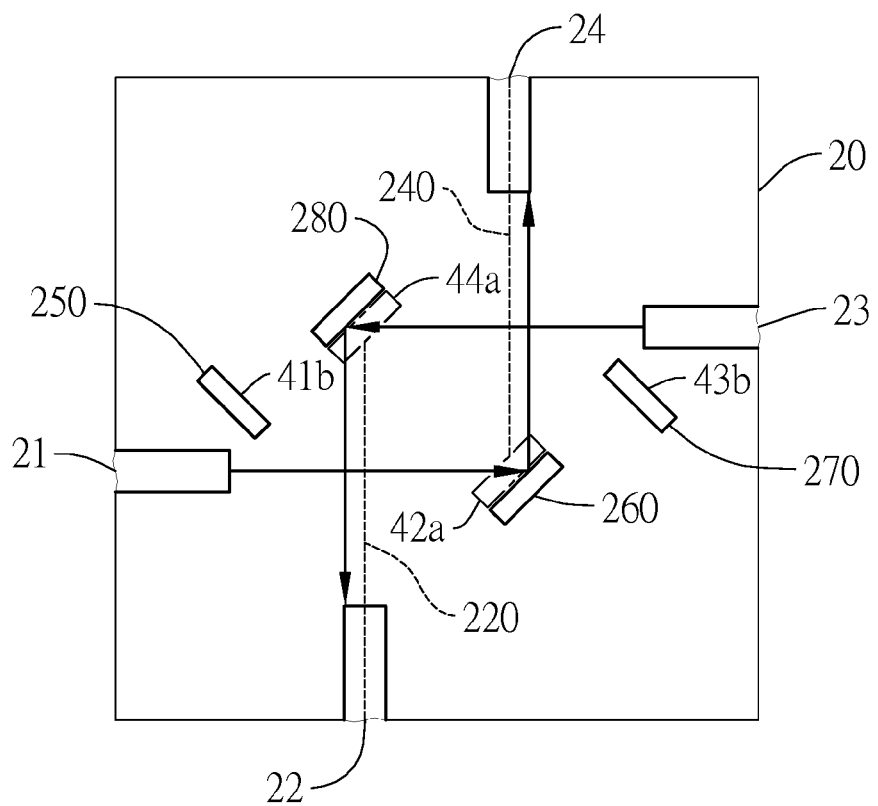

Referring to FIG. 6D, when the first and third reflective units 250, 270 are at the second positions 41b, 43b, as shown in FIG. 6B, and the second and fourth reflective units 260, 280 are at the original positions 42a and 44a, a voltage is applied to the third electro-thermal actuators 26, 28, resulting in the second cantilever with a reflective unit connected to the third electro-thermal actuators 26, 28 moving away from the reflective unit, causing the second and fourth reflective units 260, 280 disposed at the end of the second cantilever of the third electro-thermal actuators 26, 28 to depart from the original positions 42a, 44a. Consequently, the optical signal input by the first optical input pathway 21 departs, via the second reflective unit 260 moving away from the original position 42a, from the axis 240 of the second optical output pathway 24 but still enters the second optical output pathway 24, thereby resulting in attenuation of the optical signals in the second optical output pathway 24. Similarly, the optical signal input by the second optical input pathway 23 departs, via the second reflective unit 280 moving away from the original position 44a, from the axis 220 of the first optical output pathway 22 but still enters the first optical output pathway 22, thereby resulting in attenuation of the optical signals in the first optical output pathway 22. Note that the second and fourth reflective units 260, 280 are not limited to moving away from the original positions 42a, 44a concurrently in this embodiment.

As can be understood from the embodiments depicted in FIGS. 6C and 6D, the distance of the first and third reflective units 250, 270 departing from the original positions 41a, 43a can be controlled by applying a voltage to the bi-stable mechanism of the optical switches 25, 27, thereby adjusting the intensity of optical signals entering the first and second optical output pathways 22, 24. Correspondingly, the distance of the second and fourth reflective units 260, 280 departing from the original positions 42a, 44a can be controlled by applying a voltage to the third electro-thermal actuators 26, 28, thereby adjusting the intensity of optical signals entering the first and second optical output pathways 22, 24. In the embodiments illustrated in FIGS. 6C and 6D, the offsets of the first and third reflective units 250, 270 with respect to the original positions 41a, 43a and the offsets of the second and fourth reflective units 260, 280 with respect to the original positions 42a, 44a is, but is not limited to, approximately 2 µm, thereby realizing the effect of a variable attenuator.

Figure 7A:
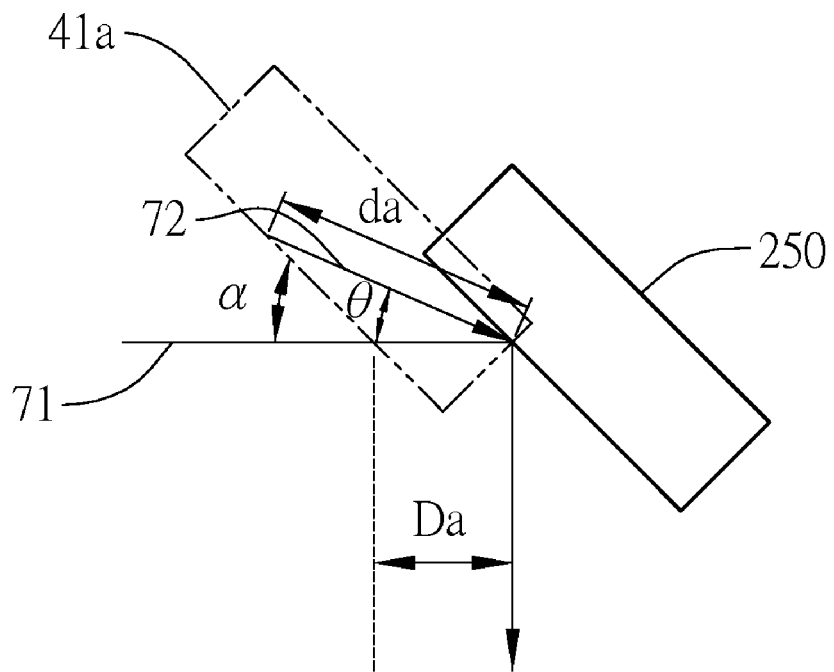
FIG. 7A is a diagrammatic illustration showing the displacement of the reflective unit of the optical switch in the optical switch device according to the present invention.
Figure 7B:
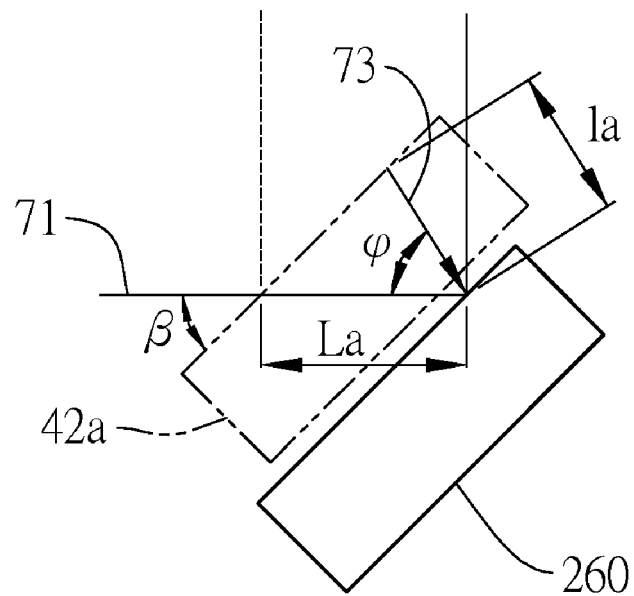
FIG. 7B is a diagrammatic illustration showing the displacement of the reflective unit of the third electro-thermal actuator in the optical switch device according to the present invention.

Turning now to FIGS. 7A and 7B, FIG. 7A illustrates the displacement of the reflective unit of the optical switch of the optical switch device according to the present invention. In view of the same operating theory of first and third reflective units 250, 270 moving on the substrate 20, the embodiment shown in FIG. 7A is exemplified by the first reflective unit 250 only. FIG. 7B shows the displacement of the reflective unit of the third electro-thermal actuator in the optical switch device according to the present invention. In view of the same operating theory of the second and fourth reflective units 260, 280 moving on the substrate 20, this embodiment is exemplified by the second reflective unit 260 only.

Referring to FIG. 7A, the first reflective unit 250 departs from an original position 41a, and an included angle α between the first reflective unit 250 and the axis 71 of the first optical input pathway remains unchanged and thus is maintained at 45 degrees. The magnitude of an included angle θ between the moving direction 72 of the first reflective unit 250 and the axis 71 of the first optical input pathway is determined at a user's discretion. Displacement $D_a$ of the first reflective unit 250 from the original position 41a is expressed as $d_a (\cos θ - \sin θ)$. Given the included angle θ of 45 degrees or 225 degrees, the optical signal entering the first optical output pathway deviates from the axis of the first optical output pathway least. Given the included angle θ of 135 degrees or 315 degrees, the optical signal generated deviates from the axis of the first optical output pathway most. When the overall design of the optical signal pathway in this embodiment is taken into account, the included angle θ is preferably 0 to 45 degrees but is not limited thereto.

Referring to FIG. 7B, the second reflective unit 260 deviates from an original position 42a, and an included angle β between the second reflective unit 260 and the axis 71 of the first optical input pathway remains unchanged and thus is maintained at 45 degrees. The magnitude of an included angle φ between the moving direction 73 of the second reflective unit 260 and the axis 71 of the first optical input pathway is determined at a user's discretion. Displacement $L_a$ of the second reflective unit 260 from the original position 42a is expressed as $l_a (\cos φ + \sin φ)$. Given the included angle φ of 45 degrees or 225 degrees, the optical signal entering the second optical output pathway deviates from the axis of the second optical output pathway most. However, in another embodiment, the aforesaid maximum offset does not necessarily take place at the included angle φ of 45 degrees or 225 degrees.

As can be seen from the foregoing embodiments, the preferred included angle θ between the moving direction 72 of the first reflective unit 250 and the axis 71 of the first optical input pathway and the preferred included angle φ between the moving direction 73 of the second reflective unit 260 and the axis 71 of the first optical input pathway both depend on the optical pathways of the optical switch device. Similarly, the aforesaid principle applies to the second and fourth reflective units 260, 280. Accordingly, the way the optical switch device of the present invention functions as an optical attenuator is not limited to the disclosure in the embodiments depicted by FIGS. 6C and 6D; hence, in another embodiment, the first and third reflective units 250, 270 move in the opposite direction, as do the second and fourth reflective units 260, 280.

Referring to FIG. 8A through FIG. 8G, cross-sectional views of a manufacturing process of the optical switch device are shown according to the present invention. The type of wafer used in this embodiment is a silicon-on-insulator (SOI) wafer.

Figure 8A:
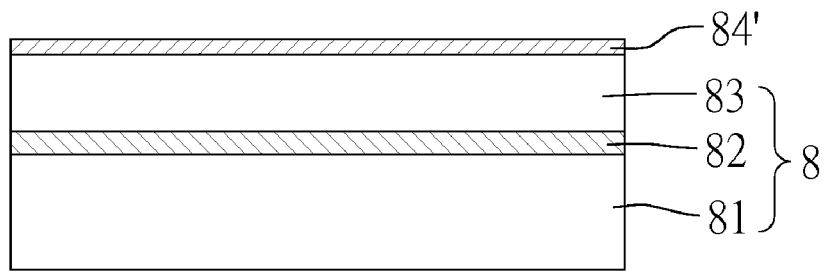
FIG. 8A through FIG. 8G are schematic views of a manufacturing process of the optical switch device according to the present invention.

FIG. 8A illustrates a first step of providing a wafer 8 comprising, in upward order, a handle layer 81, a buried oxide layer 82 and a device layer 83, wherein the handle layer 81 and the device layer 83 are preferably made of silicon, and the buried oxide layer is preferably made of silicon dioxide. The thermal oxidation technique is employed to grow a silicon dioxide layer 84' on the surface of the wafer 8.

Figure 8B:
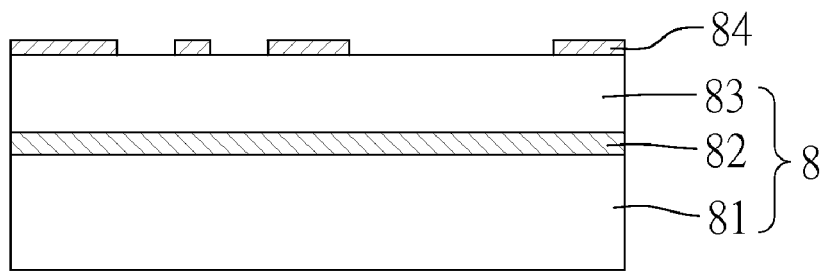

FIG. 8B depicts the subsequent step of performing photolithography and reactive-ion etching (RIE) on the silicon dioxide layer 84' such that the silicon dioxide layer 84' is patterned to form an etching mask 84.

Figure 8C:
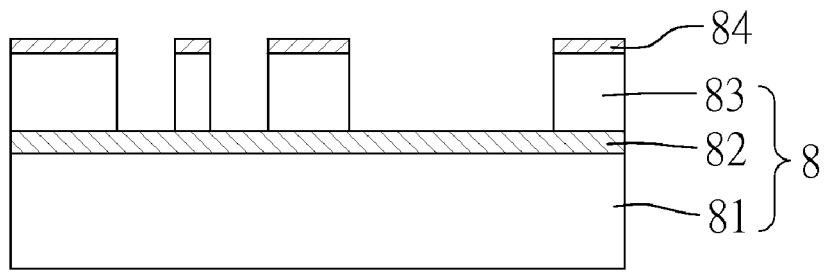

FIG. 8C shows the next step of using an inductively-coupled plasma (ICP) etcher to perform deep-reactive ion etching (DRIE) on the etching mask 84 until the buried oxide layer 82 is exposed, so as to form the basic construction of the device layer 83.

Figure 8D:
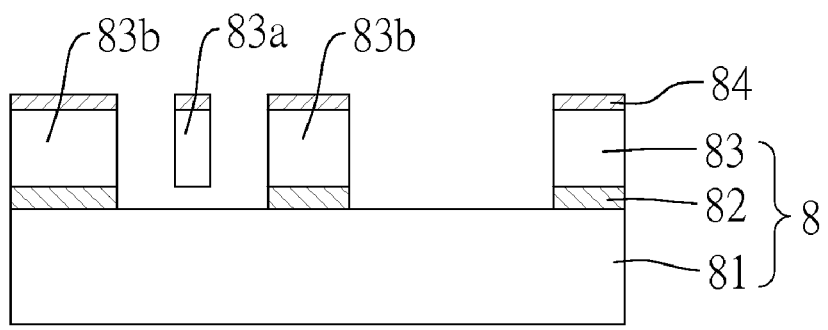

FIG. 8D depicts a further step of etching the buried oxide layer 82 beneath the device layer 83 timely by using hydrofluoric acid (HF) until the buried oxide layer 82 underneath a movable structure 83 is completely etched away such that the movable structure 83 is suspended, and a fastening structure 83b is connected to the handle layer 81 by means of the buried oxide layer 82.

Figure 8E:
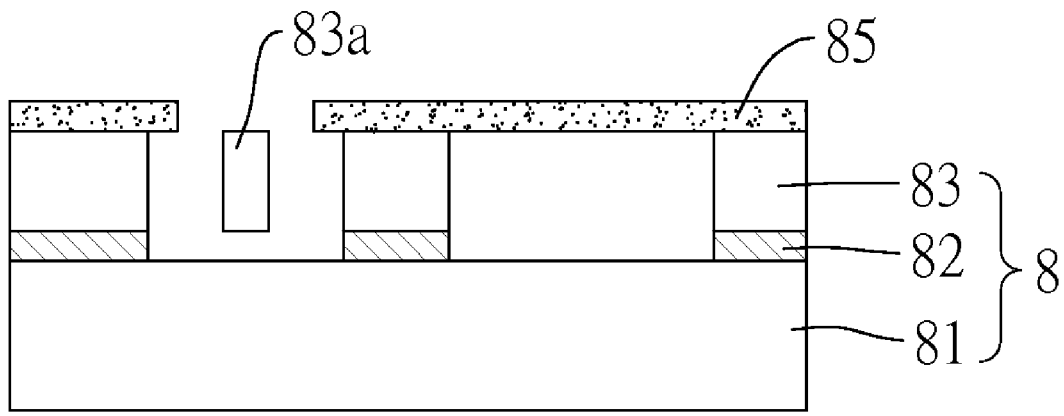

FIG. 8E shows the step of removing the etching mask 84 and cover a shadow mask 85 on the device layer 83 and expose the movable structure 83a therefrom.

Figure 8F:
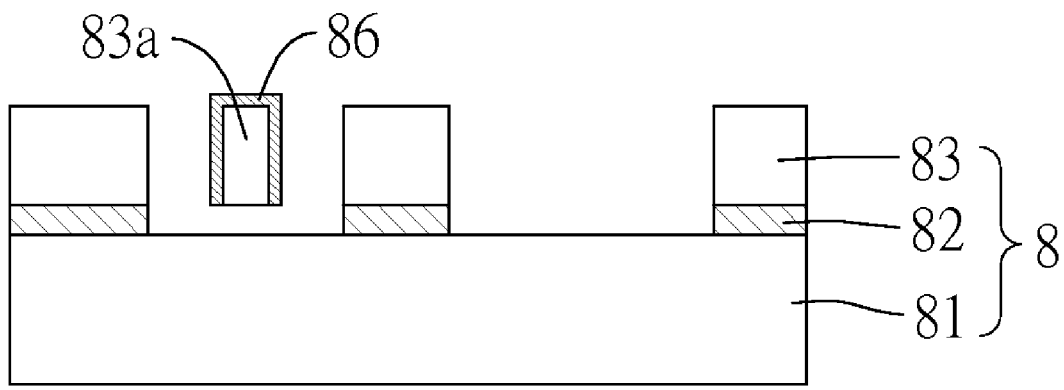

FIG. 8F shows the step of sputtering a metal 86, such as aluminum, onto the wafer 8 covered by the shadow mask 85, and then the step of removing the shadow mask 85. Owing to unevenness of the metal 86 thus formed in the fabrication process, the metal 86 is sputtered onto the surface of the movable structure 83a but not the buried oxide layer 82 underneath the device layer 83, such that insulation between the device layer 83 and the handle layer 81 is maintained.

Figure 8G:
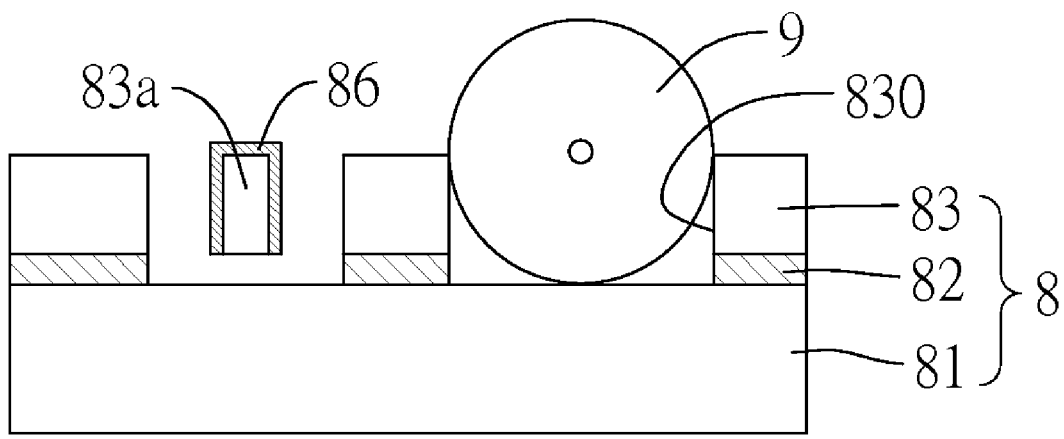

FIG. 8G illustrates the step of placing an optical fiber 9 into the groove 830 of the device layer 83 to form optical input/output pathways.

It is to be noted that, in the foregoing embodiments, the movable structure 83a remains suspended and thus is separate from the handle layer 81 underneath, wherein the movable structure 83a is the first, second or third beam of the electro-thermal actuator, the curved-beam, the first cantilever and the driving arm of the bi-stable mechanism that are movable on the substrate of the optical switch device, and wherein the fastening structure 83b includes anchors and the movable structure 83a sputtered and plated with aluminum functions as a reflective unit, such as a mirror.

In summary, the key to realizing the present invention is the employment of the split-cross-bar (SCB) configuration. With this configuration, the switching of optical signals is achieved by moving the mirrors attached on the bi-stable mechanisms using the actuators. The attenuation of optical power is carried out by moving the mirrors using the actuators and the bi-stable mechanisms. The adaptation of bi-stable mechanisms can reduce the power consumption and simplify the actuation scheme. As such, the present invention has the following advantages:

(1) With electro-thermal actuators and the bi-stable mechanism, the reflective units are fixed to two stable positions to thereby achieve the optical switching of optical signals. The bi-stable mechanism provides two stable modes for allowing reflective units to reflect optical signals and remain in the optical pathways without consuming extra energy, thereby reducing consumption of power while increasing the speed of optical switching.

(2) Voltage is applied to electro-thermal actuators and the bi-stable mechanism to change the stable positions of the reflective units to thereby adjust the energy of the output optical signals and achieve the effect of a variable optical attenuator.

(3) With a split cross-bar-type optical pathway, the optical switch and the variable optical attenuator are integrated into the same chip to thereby reduce the device size as well as the complexity of an optical fiber network.

(4) A single-mask process performed on an SOI wafer by the DRIE technique is simple enough to increase the production yield and reduce production costs.

The foregoing descriptions of the detailed embodiments are provided to illustrate and disclose the features and functions of the present invention and are not intended to be restrictive of the scope of the present invention. It should be understood by those in the art that many modifications and variations can be made according to the spirit and principles in the disclosure of the present invention and yet still fall within the scope of the invention as set forth in the appended claims.

What is claimed is:

1. An optical switch, comprising:
a bi-stable mechanism having two anchors and a curved-beam connected between said two anchors, wherein a first cantilever is provided on a bending portion of the curved-beam and extends from the curved-beam in opposite directions, and wherein one end of the curved-beam has a driving portion disposed thereon, the driving portion having a first side facing away from the curved-beam and a second side opposite to the first side, and the bi-stable mechanism having a first stable mode and a second stable mode;
a first electro-thermal actuator disposed at a position adjacent to a driven portion of the bi-stable mechanism and comprising two anchors and a first beam disposed between the anchors, wherein the first beam has a bending portion bending towards the bi-stable mechanism and a first driving arm extending from the first beam, wherein an end of the first driving arm is adjacent to a first side of the driven portion; and
a second electro-thermal actuator disposed at a position adjacent to the driven portion of the bi-stable mechanism and comprising two anchors and a second beam disposed between the anchors, the second electro-thermal actuator being coupled to the first electro-thermal actuator by connecting one of the anchors with the other, wherein the second beam has a bending portion bending away from the direction of the bi-stable mechanism and a second driving arm extending from the second beam, with an end of the second driving arm being adjacent to a second side of the driven portion.

2. The optical switch as claimed in claim 1, wherein the curved-beam bends away from the driven portion when the bi-stable mechanism is in the first stable mode.

3. The optical switch as claimed in claim 1, wherein the curved-beam bends towards the driven portion when the bi-stable mechanism is in the second stable mode.

4. The optical switch as claimed in claim 1, wherein the curved-beam and the first and second beams each comprise two adjacent conductors of different thermal expansion coefficient.

5. The optical switch as claimed in claim 1, wherein the curved-beam and the first and/or second beams each comprise a plurality of parallel beams.

6. The optical switch as claimed in claim 1, wherein the bending portions of the first and second beams bend in opposite directions.

7. The optical switch as claimed in claim 1, wherein the first cantilever and the first driving arm and/or the second driving arm are folding line structures.

8. The optical switch as claimed in claim 1, wherein the bending angle of the first driving arm and/or the second driving arm is provided with reinforced ribs.

9. The optical switch as claimed in claim 1, wherein the first cantilever is a truss structure.

10. The optical switch as claimed in claim 1, wherein the first cantilever has reflective units disposed at an end opposing the driven portion.

11. An optical switch device, comprising:
a substrate having at least an optical input pathway and an optical output pathway;
at least an optical switch as claimed in claim 1 and formed on the substrate, the at least an optical switch having a first reflective unit disposed at an end of the first cantilever opposing the driven portion; and
at least a third thermal actuator disposed in close proximity to the first cantilever of the bi-stable mechanism and comprising a third beam and an anchor disposed on both ends of the third beam and fixed in position to the substrate, wherein the third beam comprises a bending portion and a second cantilever formed on the bending portion by extending from the third beam, and wherein the end of the second cantilever has a second reflective unit.

12. The optical switch device as claimed in claim 11, wherein the bi-stable mechanism of the optical switch and the first and second electro-thermal actuators are fixed in position to the substrate via the anchors, respectively.

13. The optical switch device as claimed in claim 11, wherein the third beam comprises two adjacent conductors of different thermal expansion coefficients.

14. The optical switch device as claimed in claim 11, wherein the third beam comprises a plurality of parallel beams.

15. The optical switch device as claimed in claim 11, wherein the bending portion of the third beam bends towards the second reflective unit.

16. The optical switch device as claimed in claim 11, wherein the bending portion of the third beam bends away from the second reflective unit.

17. The optical switch device as claimed in claim 11, wherein the second cantilever is a folding line structure.

18. The optical switch device as claimed in claim 11, wherein the second cantilever is a truss structure.

19. The optical switch device as claimed in claim 11, wherein the substrate comprises a first optical input pathway, a first optical output pathway, a second optical input pathway and a second optical output pathway.

20. The optical switch device as claimed in claim 19, wherein the first optical input pathway and the second optical input pathway are parallel to each other and optical signals are alternately input in opposite directions, and the first optical output pathway and the second optical output pathway are parallel to each other and optical signals are alternately output in opposite directions.

21. The optical switch device as claimed in claim 19, wherein the first optical input pathway and the first optical output pathway are perpendicular to each other, and the second optical input pathway and the second optical output pathway are perpendicular to each other.

* * * * *